United States Patent
Prell

(10) Patent No.: US 11,365,332 B2
(45) Date of Patent: Jun. 21, 2022

(54) PLASTIC ADHESION PROMOTION FOR 2K POLYURETHANE ADHESIVES

(71) Applicant: Henkel AG & Co. KGaA, Duesseldorf (DE)

(72) Inventor: Anna Prell, Heidelberg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 157 days.

(21) Appl. No.: 16/274,595

(22) Filed: Feb. 13, 2019

(65) Prior Publication Data

US 2019/0177583 A1 Jun. 13, 2019

Related U.S. Application Data

(63) Continuation of application No. PCT/EP2017/070531, filed on Aug. 14, 2017.

(30) Foreign Application Priority Data

Aug. 24, 2016 (EP) .................... 16185488

(51) Int. Cl.
| | |
|---|---|
| *C09J 175/04* | (2006.01) |
| *C08G 18/10* | (2006.01) |
| *C09J 11/06* | (2006.01) |
| *C08K 5/20* | (2006.01) |
| *C08K 5/3415* | (2006.01) |

(52) U.S. Cl.
CPC ............ *C09J 175/04* (2013.01); *C08G 18/10* (2013.01); *C09J 11/06* (2013.01); *C08K 5/20* (2013.01); *C08K 5/3415* (2013.01)

(58) Field of Classification Search
None
See application file for complete search history.

(56) References Cited

U.S. PATENT DOCUMENTS

| | | | |
|---|---|---|---|
| 4,037,392 A | 7/1977 | Taylor et al. | |
| 4,175,161 A | 11/1979 | Fogle et al. | |
| 5,334,651 A * | 8/1994 | Schwab | ............ C08G 18/0819 524/591 |
| 5,798,409 A * | 8/1998 | Ho | .......... C08G 18/10 524/506 |
| 6,420,466 B1 | 7/2002 | Haubennestel et al. | |
| 6,794,445 B2 | 9/2004 | Reusmann et al. | |
| 8,383,713 B2 | 2/2013 | Lubnin et al. | |
| 10,428,223 B2 | 10/2019 | Dohner et al. | |
| 2007/0197720 A1 | 8/2007 | Ott et al. | |
| 2009/0062482 A1* | 3/2009 | Blum | ................. C08G 18/6659 525/450 |
| 2010/0203241 A1* | 8/2010 | Weiser | .................. C08G 18/67 427/162 |
| 2015/0057375 A1 | 2/2015 | Vandeputte et al. | |
| 2016/0024320 A1 | 1/2016 | Narayanan | |
| 2016/0185985 A1 | 6/2016 | Leutfeld et al. | |

FOREIGN PATENT DOCUMENTS

| | | |
|---|---|---|
| CN | 101921531 A | 12/2010 |
| DE | 102004012751 A1 | 10/2005 |
| EP | 0489688 A1 | 6/1992 |
| JP | 2013502494 A | 1/2013 |
| JP | 2016511304 A | 4/2016 |
| KR | 10-2014-0111038 A | 9/2014 |

OTHER PUBLICATIONS

Nonymous, Use of the new esteramide Rhodiasolv Polarclean in order to replace solvents with bad HSE profiles such as N-methyl pyrrolidone (NMP), dimethyl formamide(DMF), dimethyl acetamide (DMAC), or flammable solvents such as acetone, in various applications, IP.com Journal, 11(1B), p. 10-11. (Year: 2011).*

TDS of new raw material identified commercial name Polarclean.

International Search Report for International PCT Patent Application No. PCT/EP2017/070531 dated Nov. 10, 2017.

* cited by examiner

*Primary Examiner* — Randy P Gulakowski
*Assistant Examiner* — Ha S Nguyen
(74) *Attorney, Agent, or Firm* — James E. Piotrowski

(57) ABSTRACT

The invention relates to a polyurethane adhesive composition comprising a resin component (a) and a hardener component (b), wherein the adhesive composition further comprises N-ethyl-2-pyrrolidone and/or methyl-5-(dimethylamino)-2-methyl-5-oxopentanoate as an adhesion promoting agent. Furthermore, the invention relates to a method of use of such a polyurethane adhesive composition, as well as the use of methyl-5-(dimethylamino)-2-methyl-5-oxopentanoate and/or N-ethyl-2-pyrrolidone as an adhesion promoting agent for adhesive compositions, in particular polyurethane based adhesive compositions.

11 Claims, No Drawings

PLASTIC ADHESION PROMOTION FOR 2K POLYURETHANE ADHESIVES

The invention relates to a two component (2K) polyurethane adhesive composition comprising a resin component (a) and a hardener component (b), wherein the adhesive composition further comprises N-ethyl-2-pyrrolidone and/or methyl-5-(dimethylamino)-2-methyl-5-oxopentanoate as an adhesion promoting agent. Furthermore, the invention relates to a method of use of such a polyurethane adhesive composition, as well as the use of methyl-5-(dimethylamino)-2-methyl-5-oxopentanoate and/or N-ethyl-2-pyrrolidone as an adhesion promoting agent for adhesive compositions, in particular polyurethane based adhesive compositions.

In order to ensure sufficient adhesion of an adhesive to a substrate surface it is applied to, adhesion promoting agents are commonly used, either in the form of primer compositions for treatment of the respective surface prior to application of an adhesive thereto, or in the form of additive components to be comprised in the adhesive formulation itself. For example, abietic acids and rosin esters have been disclosed as useful tackifiers in polyurethane pressure-sensitive adhesive compositions. U.S. Pat. No. 4,037,392 discloses esters of rosin such as the pentaerythritol methyl ester, propyl ester, ethylene glycol and glycerol esters, as well as esters of hydroabietyl alcohol such as the benzoic and phthalic esters thereof, useful as tackifiers to achieve enhanced adhesion properties of polyurethane pressure-sensitive tapes.

It is an object of the present invention to provide alternative adhesion promoting agents, which result in adhesive formulations having good adhesion properties to various surfaces.

In this regard, it has been surprisingly found by the present inventors that the polyurethane adhesive composition of the present invention containing N-ethyl-2-pyrrolidone and/or methyl-5-(dimethylamino)-2-methyl-5-oxopentanoate exhibits remarkable adhesion of the composition to various surfaces it is applied to, including plastic surfaces, in particular polyvinylchloride-based surfaces. Moreover, results obtained with respect to tensile shear strengths match those obtained for compositions containing the commonly used adhesion promoters.

In a first aspect, the present invention thus relates to a two component polyurethane adhesive composition comprising a resin component (a) and a hardener component (b), wherein the adhesive composition further comprises N-ethyl-2-pyrrolidone and/or methyl-5-(dimethylamino)-2-methyl-5-oxopentanoate as an adhesion promotor.

In another aspect, the present invention also relates to the use of methyl-5-(dimethylamino)-2-methyl-5-oxopentanoate and/or N-ethyl-2-pyrrolidone as an adhesion promotor for adhesive compositions, in particular polyurethane based adhesive compositions.

Further preferred embodiments of the invention are set out in the claims.

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present, but does not mean that only one molecule of said polyol is present.

If reference is made herein to a molecular weight of a polymer or its components, this reference refers to the average number molecular weight $M_n$, if not explicitly stated otherwise. The number average molecular weight $M_n$ can be calculated based on end group analysis (OH numbers according to DIN 53240) or can be determined by gel permeation chromatography according to DIN 55672-1: 2007-08 with THF as the eluent. If not stated otherwise, all given molecular weights are those determined by end group analysis. The weight average molecular weight $M_w$ can be determined by GPC, as described for $M_n$.

All percentages given herein in relation to the compositions or formulations relate to weight % relative to the total weight of the respective composition or formula, if not explicitly stated otherwise.

In the context of the present invention, the term "NCO-reactive" refers to chemical groups that are capable of reacting with NCO groups. This includes in particular groups that comprise acidic H-atoms, like hydroxyl, primary or secondary amino, mercapto or carboxyl groups.

In the present invention, the molar ratio of the isocyanate (NCO) groups of the polyisocyanate to the sum of the hydroxyl (OH) groups of the polyol is also referred to as NCO:OH, unless explicitly stated otherwise.

The polyurethane adhesive composition according to the present invention is a two component adhesive composition and comprises a component (a) and a component (b), wherein the component (a) is a resin component and the component (b) is a hardener component.

In certain embodiments, the resin component (a) comprises at least one NCO-reactive prepolymer, and the hardener component (b) comprises at least one polyisocyanate. In certain other embodiments, however, the resin component (a) comprises at least one NCO-terminated prepolymer, and the hardener component (b) comprises at least one polyol. In such embodiments, where an NCO-terminated prepolymer is used, the hardener may instead of the at least one polyol or in addition thereto comprise other compounds that comprise at least 2 NCO-reactive groups.

In separated form, the two components (a) and (b) are storage-stable.

In each of the components, additional additives can be incorporated provided they do not react with the reactive groups of the other compounds during storage so as to ensure stability of the formulation.

In preferred embodiments according to the present invention, the resin component (a) comprises at least one NCO-reactive prepolymer. In particularly preferred embodiments, the NCO-reactive prepolymer is a hydroxyl-terminated prepolymer. In even more preferred embodiments, the NCO-reactive prepolymer is a hydroxyl-terminated polyurethane prepolymer.

Suitable hydroxyl-terminated polyurethane prepolymers may be prepared by reacting at least one polyol with at least one polyisocyanate, wherein the at least one polyol is used in molar excess relative to the sum of hydroxyl groups to isocyanate groups. In alternative embodiments, where an NCO-terminated prepolymer is used, such prepolymer may be generated by using the at least one polyisocyanate in molar excess with respect to the sum of the isocyanate groups to the sum of the hydroxyl groups of the at least one polyol. While in the following useful polyols and polyisocyanates are disclosed by reference to the first embodiment disclosed above, i.e. a hydroxyl-terminated prepolymer and a polyisocyanate hardener, it is understood that the same compounds may be used in embodiments where NCO-terminated prepolymers are used.

The at least one polyol to be employed in the preparation of the hydroxyl-terminated polyurethane prepolymer can be selected from a broad range of commercially available products, e.g. polyetherpolyols, polyesterpolyols, oleochemical polyols, aliphatic, cycloaliphatic or aromatic polyols, OH-group containing polymeric or oligomeric compounds like polycarbonates, polybutadienes, polyacrylates or mixtures thereof.

One group of suitable polyols are polyester polyols, which can be prepared by condensation of di- or tricarboxylic acids with an excess of bi- or trifunctional alcohols. The carboxylic acids may be aliphatic, cycloaliphatic, aromatic or heterocyclic or mixtures thereof. Examples of suitable acids include, without limitation, aliphatic acids, like adipic acid, sebacic acid, glutaric acid, azelaic acid, suberic acid, undecanedioic acid, dodecandioic acid, 3,3-dimethylglutaric acid, hexahydrophthalic acid; aromatic acids like phthalic acid, terephthalic acid, isophthalic acid; unsaturated acids like maleic acid, fumaric acid, dimer fatty acid; tricarboxylic acids like citric acid and trimellitic acid. Examples of suitable bi- or trifunctional alcohols include, without limitation, low molecular weight alcohols like ethylene glycol, diethylene glycol, neopentyl glycol, hexanediol, butanediol, propylene glycol, glycerol or trimethylol propane, dipropylene glycol, 1,4-butanediol, 1,6-hexanediol, 1,8-octanediol, 1,10-dicanediol, 1,12-dodecanediol, 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol, as well as glycerol, trimethylolpropane, or mixtures of the aforementioned.

Another group of suitable polyester polyols are based on ε-caprolactone, also called polycaprolactones, or on hydroxycarboxylic acids, for example ω-hydroxycaproic acid. Such polyols contain at least two OH groups, preferably terminal OH groups.

Another group of polyester polyols, which are useful in the invention, are the so called oleochemical polyols. Such polyester polyols can be prepared, for example, by complete ring-opening of epoxidized triglycerides of a fat mixture, which comprises at least partly olefinically unsaturated fatty acids with one or more alcohols having 1 to 12 alcohols, and subsequent partial transesterification of the triglyceride derivatives to give alkyl ester polyols having 1 to 12 C atoms in the alkyl radical. Another group of such preferably suitable polyols based on natural products are dimer diols, as well as castor oil and derivatives thereof.

Another group of polyols are polyacetals. Polyacetals are understood to be compounds obtainable by reacting glycols, for example diethylene glycol or hexanediol or mixtures thereof, with formaldehyde. Polyacetals suitable for the purposes of the invention may also be obtained by polymerizing cyclic acetals.

Another group of polyols are polycarbonates. Polycarbonates may be obtained, for example, by reacting diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene.

Other suitable polyol components are polyether polyols, which are the reaction products of low molecular weight polyhydric alcohols with alkylene oxides. The alkylene oxides preferably contain 2 to 4 carbon atoms. Suitable reaction products of the type in question are, for example, the reaction products of ethylene glycol, propylene glycol, the isomeric butane diols, hexane diols or 4,4'-dihydroxy-diphenyl propane with ethylene oxide, propylene oxide or butylene oxide or mixtures of two or more thereof. The reaction products of polyhydric alcohols, such as glycerol, trimethylol ethane or trimethylol propane, pentaerythritol or sugar alcohols or mixtures of two or more thereof, with the alkylene oxides mentioned to form polyether polyols are also suitable. Such polyether polyols are available with different molecular weights, as compositions, as homopolymers or statistical or blockcopolymer. Another group of polyether polyols are polytetramethylenglycoles, which can be prepared by polymerization of tetrahydrofuran.

Also suitable are polyetherglycols with low molecular weight of less than 500 g/mol.

Other examples of low molecular weight polyols include low molecular weight diols and triols, for instance $C_2$ to $C_{20}$ diols, like ethylene glycol, propylene glycol, 1,2-butandiol-1,2 or 1,4-butanediol, 1,5-petanediol, 1,6-hexanediol, 1,8-octanediol, 1,12-dodecandiol, dimeric fatty acid alcohols or higher homologuous diols or their isomers. Additionally, polyols with more than 3 functional groups can be used, like glycerol, trimethylol ethane, pentaerythrite and/or trimethylol propane, or higher functional alcohols like sugar alcohols.

The composition may further comprise polyols that are hydroxy-functionalized polymers, for example hydroxy-functionalized siloxanes. Exemplary siloxanes that may be used are hydroxy-functionalized polydimethylsiloxanes, in particular in liquid form, such as those commercially available under the name Tegomer® H-Si 2311 (Evonik, Germany) having a molecular weight $M_n$ of about 2,200 g/mol. Suitable polydimethylsiloxane (PDMS) polyols are, for example, described in U.S. Pat. No. 6,794,445 B2. They may be used in amounts of up to 60 wt.-% based on the total weight of the polyols used and typically have low $T_g$ values, for example in the range of from −150 to −100° C.

Also suitable for use in the invention are hydroxyfunctional polybutadienes, known by the commercial name of Poly-bd®.

For the preparation of the resin component (a), one or more of the aforementioned polyols may be reacted with at least one polyisocyanate in order to form a hydroxyl-terminated polyurethane prepolymer. The one or more polyols are used in molar excess relative to the NCO groups of all polyisocyanates present in the reaction mixture, such that after complete reaction of all NCO groups, OH-terminated polyurethane prepolymers are obtained. In certain embodiments, the NCO:OH ratio of the NCO-reactive polyurethane prepolymer is 1:1.5 to 1:5.

Suitable polyisocyanates to be used for the preparation of the hydroxyl-terminated polyurethane prepolymer are known the art and may include monomeric isocyanates, which contain two or three NCO groups. For instance, they include well-known aliphatic, cyclo-aliphatic or aromatic monomeric diisocyanates. Preferably, isocyanates are selected with a molecular weight from 160 g/mol to 500 g/mol, for example aromatic polyisocyanates, for example the isomers of diphenylmethanediisocyanate (MDI), such as 4,4'-diphenylmethanediisocyanate (4,4'-MDI), 2,2'-diphenylmethane diisocyanate (2,2'-MDI), 2,4'-diphenylmethane-diisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODI), toluene diisocyanate, naphthalene, di- and tetraalkyl diphenylmethane diisocyanate, 4,4'-dibenzyl diisocyanate, and combinations thereof.

Aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-diisocyanato-cyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof can also be used.

It is also possible to include at least partly oligomeric diisocyanates such as allophanate, carbodiimide, isocyanurate, biuret condensation products from diisocyanates, e.g., from HDI, MDI, IPDI or other isocyanates. Polymeric MDI can also be employed. Mixtures of aliphatic or aromatic isocyanates can be used. More preferably aromatic diisocyanates may be used.

In certain embodiments, the at least one NCO-reactive prepolymer of the resin component (a) has an average number molecular weight $M_n$ in the range of 400 to 100,000, preferably 1,000 to 50,000 g/mol, more preferably 5,000-50,000 g/mol.

In alternative embodiments, the resin component can comprise the above-mentioned polyols as such, optionally in combination with the afore-described prepolymers.

Further, the adhesive composition according to the present invention comprises a hardener component (b). According to preferred embodiments of the present invention, the hardener component (b) comprises at least one polyisocyanate. The polyisocyanates may be selected from those that have been disclosed in connection with the prepolymers above.

In one embodiment of the invention, aromatic diisocyanates are preferred as polyisocyanates, while in another embodiments, mixtures of aliphatic and/or cyclo-aliphatic with aromatic isocyanates are preferably used.

The viscosity of the at least one polyisocyanate to be comprised in the hardener component (b) is preferably less than 80 mPa·s, particularly preferably from 30 to 60 mPa·s (DIN ISO 2555, Brookfield RVT, spindle No. 3, 25° C.; 50 rpm).

The polyurethane adhesive composition according to the present invention further comprises at least one adhesion promoter. The at least one adhesion promoter may be comprised in component (a), component (b) or both of component (a) and component (b) of the adhesive composition according to the present invention. According to the present invention, the at least one adhesion promoter is N-ethyl-2-pyrrolidone and/or methyl-5-(dimethylamino)-2-methyl-5-oxopentanoate. However, as NEP requires explicit labelling (H318 and H361D) of compositions if is contained in in an amount of more than 0.3% by weight, among the two aforementioned inventive adhesion promoting agents, methyl-5-(dimethylamino)-2-methyl-5-oxopentanoate is preferably used. Thus, according to certain embodiments, the at least one adhesion promoter is methyl-5-(dimethylamino)-2-methyl-5-oxopentanoate. In various embodiments, the compositions described herein may thus be essentially free of NEP, i.e. do not contain any deliberately added NEP in significant amounts.

N-Ethyl-2-pyrrolidone is a compound of the following formula:

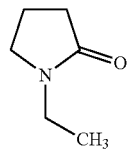

Methyl-5-(dimethylamino)-2-methyl-5-oxopentanoate is a compound of the following formula:

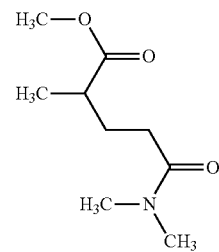

Surprisingly, it has been found that by incorporating N-ethyl-2-pyrrolidone and/or methyl-5-(dimethylamino)-2-methyl-5-oxopentanoate as an adhesion promotor in polyurethane based adhesive compositions, adhesiveness of the respective composition to various surfaces may be enhanced. In particular, adhesion of the respective polyurethane based adhesive compositions may be enhanced on surfaces consisting of plastic materials, such as polyvinylchloride (PVC).

Without wishing to be bound by theory, it is assumed that methyl-5-(dimethylamino)-2-methyl-5-oxopentanoate causes plastic surfaces, in particular, PVC-based plastic surfaces, to soften and swell, thereby promoting adhesion of the adhesive composition applied thereto.

In various embodiments, the at least one adhesion promoting agent N-ethyl-2-pyrrolidone, methyl-5-(dimethylamino)-2-methyl-5-oxopentanoate or a mixture of the aforementioned is present in the adhesive composition according to the present invention in an amount of 1-10 wt.-%, preferably 3-7 wt.-%, based on the total weight of the polyurethane adhesive composition.

In addition, the adhesive according to the invention may contain other auxiliary materials, which are preferably admixed wholly or partially with the resin component. Auxiliaries mean substances, which are generally added in small quantities in order to modify the properties of the adhesive in a desired direction, for example viscosity, wetting behavior, stability, rate of reaction, or storage life. Such additives for the improvement of special properties are for example antifoam agents, wetting agents or surfactants, like stearates, silicone oil and addition products of ethylene oxide or propylene oxide with fatty alcohols; UV stabilizers antioxidants, like sterically hindered phenols, thioethers, substituted benzotriazoles or from the HALS type; additional adhesion promoters, for example silanes containing hydrolysable groups like hydroxy functional, (meth)acryloxy functional, amino functional or epoxyfunctional trialkoxysilanes, including methoxy, ethoxy, propoxy or butoxy groups; and fire retardants.

To increase the reactivity of the adhesive for crosslinking, the adhesive may optionally contain catalysts. Suitable catalysts, which can be employed according to the invention are, in particular, the organometal and/or aminic catalysts. Examples include titanates like tetrabutyl titanate or tetrapropyl titanate, dibutyl tin dilaulate (DBTL), dibutyl tin diacetate, tin octoate, dibutyl tin oxide, chelated metals, like Zr-acetylacetonate, Ti-acetylacetonate, Fe-acetylacetonate, amino compounds like triethylenetetramin, triethylenediamin diethylaminopropylamin, morpholin, N-methylmorpholin, 1,8-diazabicyclo-[5,4,0]-undecen-7 (DBU), cyclohexylamin, 2-ethyl-4-methylimidazole. Catalysts are incorporated preferably in the hardener component.

Another group of additives are tackifying resins. Resins are known in different composition and types as synthetic resin or as natural resin. Examples for such resins are abietic acid, abietic acid esters, terpene resins, terpene/phenol resins, poly-α-methylstyrene or aliphatic, aromatic or aromatic/aliphatic hydrocarbon resins or coumarone/indene resins.

Optionally, the adhesive may contain pigments or fillers. Such additives can be used to modify specific properties of the adhesive. Examples are oxides, silicates, sulfates, phosphates or carbonates of Ti, Zr, Al, Fe, Mg, Ca, Ba or Zn, such as natural, ground chalk, precipitated chalk, barytes, talcum, mica, carbon black, titanium dioxide, iron oxides, aluminum oxide, zinc oxide, zinc sulfate or silicon dioxide. Water-absorbing powders, for example zeolite, may also be present as a filler. The fillers should be present in finely divided form, for example of 1 to 200 μm, in particular up to 50 μm, in size, but they may also be nano-scale pigments.

The composition may further contain silicon dioxide. Examples include treated silicas, precipitated silica, untreated silica especially pyrogenic silica or fumed silica is useful.

The composition may further include additional polymers containing a plurality of carboxylic acid groups and/or hydroxyl groups. Such components can be selected for examples from polycarboxylic polyhydroxy acid amides, polycarboxylic acid amides, and modified polyhydroxy ureas. Such polymers are known as physically thixotropy agents and are commercially available. They are disclosed for examples in U.S. Pat. No. 6,420,466 or EP1048681.

In principle, the different additives and auxiliaries can be included in each of the components. But it is useful to select such additives, which do not react with the other compounds of component (a) or (b). In specific embodiments, the catalyst is added in component (b).

Methods for the preparation of both the resin component (a) and the hardener component (b) are known in the art. The two components are stored separately until use. For use, the resin and the hardener components are mixed together in a manner known per se. After mixing of the resin component (a) with the hardener component (b), the ratio of the isocyanate groups present in the adhesive composition to the OH groups present in the adhesive composition is generally in the range of equivalence, it being convenient to provide a slight excess of isocyanate groups with regard to moisture present on the surface. The NCO/OH ratio should amount to between 0.90:1 and 1.5:1, in particular 1.0:1 to 1.3:1.

The polyurethane adhesives of the invention are liquid at application temperatures. It is preferred that the polyurethane adhesives of the invention are liquid at room temperature. In various embodiments, the adhesive compositions according to the present invention have a viscosity of 500 to 100,000, especially 1,000 to 20,000 mPas at a temperature of 40° C., as determined according to DIN ISO 2555 (Brookfield viscometer RVT, spindle No. 4, 25° C.; 5 rpm). The adhesives described herein may contain one or more solvents or may be solvent-free. Suitable solvents known to those skilled in the art, in particular, esters, ketones, halogenated hydrocarbons, alkanes, alkenes and aromatic hydrocarbons. Particular examples of suitable solvents are methylene chloride, trichlorethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether, ethylene glycol monoethyl, 2-ethylhexyl acetate, glycol diacetate, heptane, hexane, isobutyl acetate, isooctane, isopropyl acetate, methyl ethyl ketone, tetrahydrofuran or tetrachlorethylene, or mixtures of two or more of the solvents mentioned. In preferred embodiments, the polyurethane adhesive composition according to the present invention is free of solvents.

The adhesives can be applied to the substrate by all known techniques, including without limitation, spraying, painting, dip-coating, spin-coating, printing and the like.

Thus, another embodiment of the invention is method of use of the polyurethane adhesive composition according to the present invention. In various embodiments, such a method encompasses a process of applying the adhesive composition to the surface of a substrate, whereby the adhesive is a polyurethane adhesive composition as described above. In the process according to the invention, the two components (a) and (b) of the adhesive are mixed immediately before application. The adhesive composition is subsequently applied to the surface of the substrate.

Another embodiment of the invention is a bonded structure consisting of a substrate, a cured adhesive and a second substrate, wherein the cured adhesive is obtainable from an adhesive composition as described above, comprising a component (a), and a component (b), which is applied and forms after application to the substrate an adhesive layer. The so applied adhesive layer provides a bonding layer between the substrates, which is stable as structural bond under different conditions of use.

Another object of the present invention is the use of methyl-5-(dimethylamino)-2-methyl-5-oxopentanoate, and the use of N-ethyl-2-pyrrolidone, respectively, as an adhesion promotor for adhesive compositions, in particular polyurethane based adhesive compositions.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

EXAMPLE SECTION

Example 1

Results obtained with respect to tensile shear strength of polyurethane adhesive compositions containing methyl-5-(dimethylamino)-2-methyl-5-oxopentanoate (MDMO) or NEP or no adhesion promoter.

TABLE 1

| | 2K PU using NEP 4.9 wt.-% | | 2K PU using MDMO 4.9 wt.-% | | 2K PU without adhesion promotion | |
|---|---|---|---|---|---|---|
| | Tensile Shear Strength (MPa) | Standard Deviation (MPa) | Tensile Shear Strength (MPa) | Standard Deviation (MPa) | Tensile Shear Strength (MPa) | Standard Deviation (MPa) |
| Tensile Shear Strength aluminum, grit blasted, 1 week curing at room temperature (MPa) | 17.46 | 1.3 | 18.19 | 1.6 | | |
| Tensile Shear Strength PVC, 1 week curing at room temperature (MPa) | 7.42 | 0.9 | 7.31 | 0.7 | 3.33 | 1.0 |
| Tensile Shear Strength on customer PVC parts, 1 week curing at RT (MPa) | 5.91 | 0.1 | 6.09 | 0.1 | | |

The results show that NEP and MDMO both increase tensile shear strength compared to a composition without adhesion promoters on PVC and aluminum substrates.

Example 2

The wetting behaviors of various additives were investigated. Methyl-5-(dimethylamino)-2-methyl-5-oxopentanoate and N-ethyl-2-pyrrolidone (NEP) both cause PVC surfaces to soften and swell. This observation is assumed to indicate the adhesion promotion capabilities of the additives to plastics.

Another additive, which also demonstrated this behavior was a mixture of dimethyl glutarate 55-65%, dimethyl succinate 15-25%, and dimethyl adipate 10-25%.

These were not pursued in the product development due to tensile shear strength values on PVC, which were not as high as formulations using methyl-5-(dimethylamino)-2-methyl-5-oxopentanoate (ca. 5 MPa versus values of 7 MPa for NEP or methyl-5-(dimethylamino)-2-methyl-5-oxopentanoate based formulations).

Methylethylketone (MEK) was also found to exhibit this wetting behavior and also showed adhesion to PVC similar to the NEP/MDMO containing compositions. This additive was not pursued further due to its flammable classification.

The invention claimed is:

1. A two component polyurethane adhesive composition comprising a resin component (a) and a hardener component (b), wherein
    a) the resin component (a) comprises at least one NCO-reactive prepolymer having an average number molecular weight $M_n$ in the range of 400 to 100,000, and the hardener component (b) comprises at least one polyisocyanate, or
    b) the resin component (a) comprises at least one NCO-terminated prepolymer, and the hardener component comprises at least one polyol; and
    further comprising as adhesion promoter (c) methyl-5-(dimethylamino)-2-methyl-5-oxopentanoate; wherein the composition is free of solvents and polymers containing a plurality of carboxylic acid groups.

2. A two component polyurethane adhesive composition according to claim 1 wherein adhesion promoter (c) comprises a mixture of N-ethyl-2-pyrrolidone and the methyl-5-(dimethylamino)-2-methyl-5-oxopentanoate.

3. The polyurethane adhesive composition according to claim 1, wherein the NCO-reactive prepolymer has an average number molecular weight $M_n$ in the range of 5,000 to 50,000.

4. The polyurethane adhesive composition according to claim 1, wherein the NCO-reactive prepolymer is a reaction product of an isocyanate and a polyol at a NCO:OH ratio in the range of 1:1.5 to 1:5.

5. The polyurethane adhesive composition according to claim 1 wherein the adhesion promoter (c) is present in an amount of 1-10 wt.-% based on the total weight of the polyurethane adhesive composition.

6. The polyurethane adhesive composition according to claim 1, wherein the resin component (a) and the hardener component (b) have a NCO/OH ratio between 0.90:1 and 1.5:1.

7. The polyurethane adhesive composition according to claim 1 further comprising at least one of auxiliary material, catalyst, additive, pigments, fillers and thixotropy agents.

8. A cured reaction product of the two component polyurethane composition of claim 1.

9. An article comprising a substrate and a cured reaction product of the two component polyurethane composition of claim 1 bonded to the substrate.

10. The two component polyurethane adhesive composition according to claim 1 wherein the composition is free of polyols with more than 3 functional groups and free of isocyanates containing 3 NCO groups.

11. A two component polyurethane adhesive composition comprising a resin component (a) and a hardener component (b), wherein
    a) the resin component (a) comprises at least one NCO-reactive prepolymer having an average number molecular weight $M_n$ in the range of 400 to 100,000, and the hardener component (b) comprises at least one polyisocyanate, or
    b) the resin component (a) comprises at least one NCO-terminated prepolymer, and the hardener component comprises at least one polyol; and
    further comprising as adhesion promoter (c) a mixture of N-ethyl-2-pyrrolidone and methyl-5-(dimethylamino)-2-methyl-5-oxopentanoate.

* * * * *